United States Patent [19]
McCormick et al.

[11] 3,873,678
[45] Mar. 25, 1975

[54] METHOD FOR MAKING FERRIC CHLORIDE

[75] Inventors: Walter R. McCormick, Salt Lake City; William J. Lewis, South Ogden, both of Utah

[73] Assignee: N L Industries, Inc., New York, N.Y.

[22] Filed: Aug. 2, 1973

[21] Appl. No.: 385,052

[52] U.S. Cl. ............... 423/493, 423/138, 423/503
[51] Int. Cl. ............................................. C01g 49/10
[58] Field of Search ............ 423/499, 492, 76, 138, 423/493, 503; 23/503; 159/15

[56] References Cited
UNITED STATES PATENTS

| | | | |
|---|---|---|---|
| 1,054,400 | 2/1913 | Dow et al. | 423/493 |
| 1,938,461 | 12/1933 | Prutton | 423/493 |
| 3,268,289 | 8/1966 | Macey | 423/499 |

OTHER PUBLICATIONS

Hackh's Chemical Dictionary, 1944 Ed., page 786, Third Ed., McGraw-Hill Book Co., Inc., New York.

*Primary Examiner*—Edward Stern

[57] ABSTRACT

A concentrated ferric salt solution useful for treatment of sewage is produced from a waste acid solution of a ferrous salt by neutralizing the free acid in the ferrous salt solution followed by concentration and chlorination wherein chlorination is effected by reacting liquid or gaseous chlorine with the waste acid in a manner to achieve substantially 100% utilization of said chlorine.

1 Claim, 1 Drawing Figure

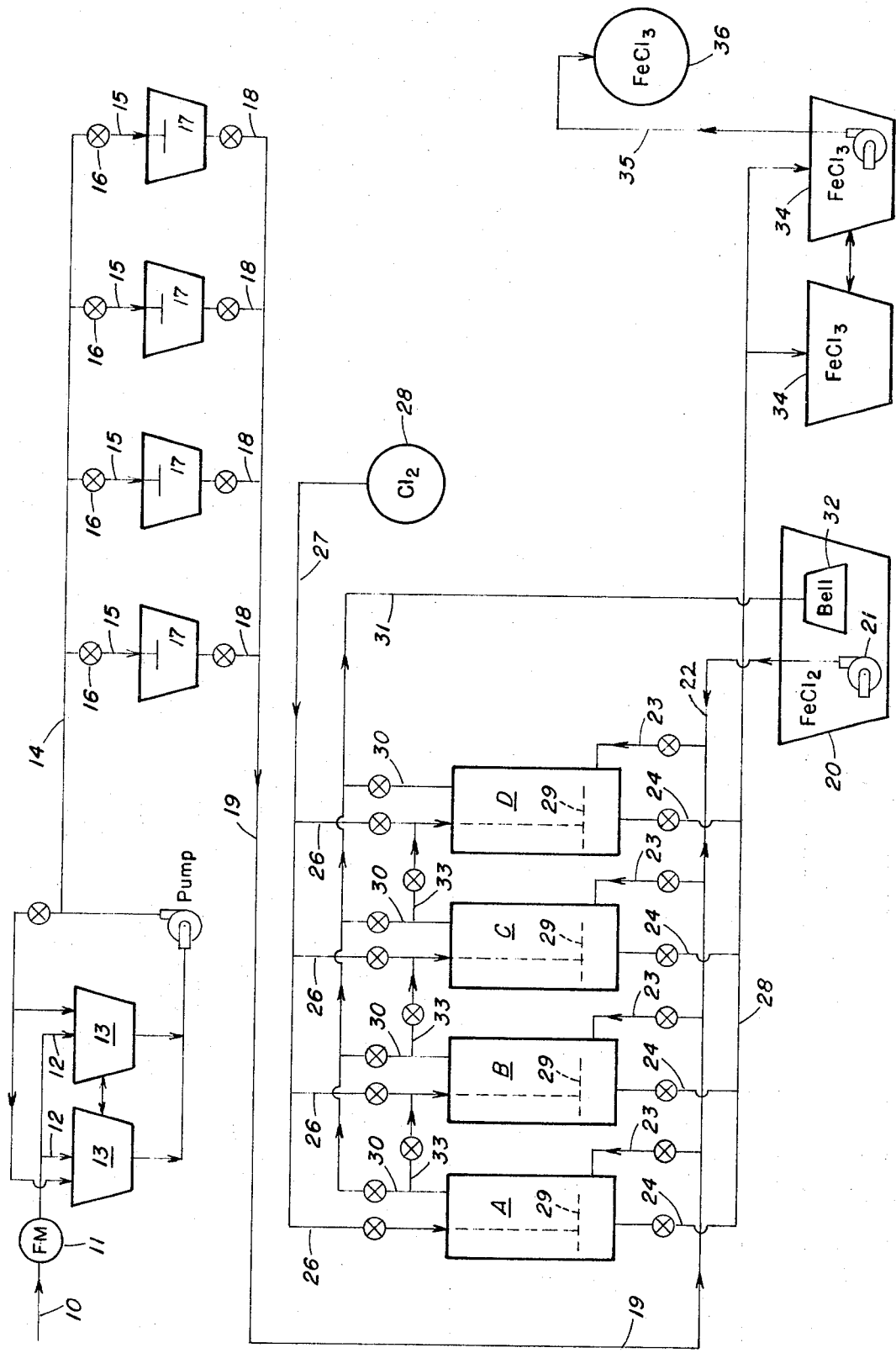

METHOD FOR MAKING FERRIC CHLORIDE

BACKGROUND OF THE INVENTION

Numerous methods have been devised in the past for producing ferric salts from ferrous salt solutions. U.S. Pat. No. 1,054,400 discloses using a weak ferrous chloride solution which is reduced by adding a small amount of metallic iron followed by concentration by boiling to a specific gravity of 42 Be. The concentrated solution is then acidified by adding concentrated hydrochloric acid and thereafter chlorinated with chlorine gas to produce ferric chloride. U.S. Pat. No. 1,938,461 discloses a method of making ferric chloride dihydrate by evaporating a ferrous chloride solution and then drying the dihydrate to produce an anhydrous ferrous chloride salt which is pulverized and then chlorinated to produce ferric chloride. U.S. Pat. No. 2,083,692 discloses production of ferric chloride by chlorinating a dry mixture of ferrous chloride and iron in the proportions of 20:1 at temperatures in the range 400° – 450°C; and U.S. Pat. No. 2,010,756 discloses making commercial ferric chloride solutions by dissolving metallic iron in ferric chloride to produce ferrous chloride and continuously recirculating the ferrous chloride in contact with chlorine gas to form ferric chloride.

With the increased interest in ecology and in particular, ways and means for curtailing the present practice of polluting fresh water streams, rivers, lakes and the like, with industrial waste products, improved processes are being sought for converting industrial waste products, such as waste acids and pickle liquors, into useful products for water purification and for sewage treatment of the chemical precipitation type.

SUMMARY OF THE INVENTION

The present invention is the discovery and development of a highly efficient and economical process for producing a concentrated ferric salt on a commercial plant scale using as source material, industrial waste liquors; and is characterized by a sequence of steps including neutralization of the free acid in the waste liquor, solar concentration of the neutralized liquor to any desired level followed by chlorination of the concentrated salt solution in a manner to preclude venting toxic gases into the atmosphere and to produce a ferric salt solution of quality suitable for sewage treatment by chemical precipitation.

The ferrous salt solution subjected to oxidation, that is to say, increase in positive valence, by the process of the instant invention is ferrous chloride and in particular, aqueous solutions of ferrous chloride as occur in industrial waste liquors such as waste pickle liquors.

Pickle liquors, as the term is used herein, is definitive of the impoverished liquors resulting from the treatment of iron, steel and similar ferrous products with aqueous solutions of hydrochloric acid. These liquors comprise aqueous, weakly acidic solutions of 16 to 20% ferrous chloride and of the order of 1 to 1.5% free hydrochloric acid.

According to the present invention neutralization of the aqueous, acidic, ferrous chloride solution is effected by feeding it to one or more neutralizing vessels to which scrap iron is periodically or continuously added; and recycling the acidic solution until substantially all of the free acid is completely neutralized. The neutralized ferrous chloride solution is then concentrated to any desired degree by feeding it to a plurality of evaporators in the form of solar ponds where a substantial portion of the water is evaporated from the neutralized ferrous chloride solution. The concentrated ferrous chloride solution is then fed to a storage basin from which the ferrous chloride solution is pumped, in a selected sequence, to a battery of chlorinators into which chlorine, either liquid or gaseous, is fed to oxidize the ferrous ions to ferric ions in the solution. Each chlorinator is sealed from the atmosphere and off-gases from each chlorinator are fed directly into the top of an inverted bell immersed in the ferrous chloride solution in said storage basin whereby any free chlorine in the off-gases from said chlorinators, or in the depressurized chlorinators, is used to oxidize the ferrous chloride in the storage basin. Thus, the escape of any free chlorine into the atmosphere is effectively prevented. From the chlorinators, the ferric chloride solution is fed into a series of interconnected storage and/or evaporator basins where the aqueous solution may be concentrated by solar evaporation or the like — and then pumped to storage tanks.

The invention may be better understood from a consideration of the following description in conjunction with the accompanying drawing.

DESCRIPTION OF THE DRAWING

The drawing is a schematic illustration of apparatus used to produce a concentrated ferric chloride solution from industrial pickle liquors.

PREFERRED EMBODIMENT OF THE INVENTION

While the process of this invention can be adapted to small scale operations wherein chlorination of the concentrated ferrous chloride solution is carried out in a single chlorinator it has been found that for commercial operations semi-continuous or continuous chlorination should be practiced.

As pointed out above, raw pickle liquor may average about 18% ferrous chloride and about 1% free hydrochloric acid, the remainder comprising about 80% water; and in as much as a large volume of water is expensive to handle during chlorination, it is essential that the water be removed to a level of at least about 65% prior to chlorination. However, it has been found that because of the amount of free hydrochloric acid in the pickle liquor the pickle liquor can not be concentrated to the desired level, that is to say, about 33 to 35% ferrous chloride, without first neutralizing the free acid for otherwise hydrogen chloride fumes will be emitted to the atmosphere. Consequently, the initial step of the process of this invention is that of neutralizing the pickle liquor so as to reduce the free hydrogen chloride to a low enough level to preclude emission of hydrochloric acid fumes during concentration. Further, the free acid concentration must be reduced to a level low enough (below about 0.10% HCl) to insure a chlorinated product substantially free of hydrogen chloride.

Referring now to the drawing which is schematic flow diagram of the process of this invention adapted to a commercial operation, the source of the ferrous chloride pickle liquor is indicated by pipe 10 having flow meter 11 and connected by branch lines 12 – 12 to a pair of neutralizing vessels 13 – 13. These may be suitably designed tanks, but in the present embodiment are open air basins lined with polyethylene or an equivalent material. The acid neutralizing agent is in this embodiment, metallic iron in the form of stampings, chips, and the like and is spread substantially uniformly over the bottom of each basin. The pickle liquor is adapted to be pumped alternately into the first one and then the other of the two basins and to be recycled to the basins in a substantially continuous operation using conventional pumps and pipe line circuitry as shown schematically in the drawing.

The pickle liquor from the basins in periodically checked for free acid and when found to be substantially completely neutralized is pumped by way of pipe line 14 and branch pipe lines 15, including valves indicated generally at 16, to a plurality of solar evaporating basin 17. These basins may be similar in construction to the neutralizing basin 13 and while four evaporating basins are shown, it will be understood that the number of basins used depends primarily on the size of the commerical operation. Also, less than all of the basins may be used at any one time to concentrate the pickle liquor, the remaining basins being isolated and used, for example, for storage of concentrated pickle liquor, as circumstances dictate.

The concentrate from the evaporator basin 17 is adapted to be pumped or otherwise fed by way of branch pipe 18 and feed pipe 19 to a receiving vessel indicated at 20. The latter is provided with a pump 21 by which the concentrated ferrous chloride in the receiving vessel is pumped by way of a feed pipe 22 and valved branch pipes 23 to a plurality of chlorinators A, B, C, and D, each of which comprises a pressure vessel formed of steel or other suitable metal and lined with an insulated material for withstanding the corrosive effect of the chlorine at elevated temperatures and pressures. The bottom of each pressure vessel is provided with a valved discharge pipe 24, each of which is connected to a commom discharge pipe 25, Referring again to the pressure vessels, each is provided at its upper end with an inlet pipe 26 connected to a common chlorine feed pipe 27 arranged to feed liquid or gaseous chlorine, as the case may be, from a suitable source indicated generally at 28 to the respective chlorinators each inlet pipe having suitable valves for controlling the flow of chlorine to the respective chlorinators.

The chlorine inlet pipe of each chlorinator is extended downwardly therein to a point immediately above the bottom thereof and provided with a sparger or spray-head as indicated at 29. Each chlorinator is also provided with an outlet pipe in the top thereof as shown at 30 for discharging gaseous chlorine from the chlorinators, each outlet pipe having a valve and each connected to a common return pipe 31. The return pipe 31 is adapted to discharge gaseous chlorine and/or air from the chlorinators into a bell 32 immersed in the aforesaid receiving vessel 20. As explained below, free chlorine evacuated from the chlorinators is thus carried below the surface of the ferrous chloride in the receiving vessel 20 where it is consumed in the oxidation of ferrous chloride thus, effectively preventing free chlorine from escaping to the atmosphere.

Each chlorinator may be used independently of the others, but are preferably joined by valved connecting pipes 33 so that the chlorinators may be used in sequence. Thus, at start-up all chlorinators are filled to capacity with ferrous chloride solution by opening the valves in branch pipes 23, which are supplied with ferrous chloride solution from the receiving vessel 20.

When each chlorinator is filled the respective valves are closed. The valves in the outlet pipes 30 of each chlorinator are also closed while the valves in the connecting pipes 33 are opened. The valve in the liquid chlorine feed line 26 of chlorinator A is then opened and liquid chlorine fed into the chlorinator by way of its sparger 29. The liquid chlorine oxidizes the ferrous chloride solution to ferric chloride accompanied by a rise in temperature and pressure, and an increase in rate of chlorination. Chlorination is continued until there is an appreciable slowing down in the rate of chlorination at which time free chlorine gas begins to pass over into chlorinator B by way of connecting pipe 33, this free chlorine being dissipatd in the second chlorinator by reacting with the ferrous chloride solution therein. Chlorination in the first chlorinator will be substantially complete when the ferrous ion concentration is less than 0.1% at which time some free chlorine may also be passing over into chlorinator C. Chlorinator A is then isolated from the system by first shuting off the liquid chlorine feed line 26 and closing the pipe 33 whereby gaseous chlorine being discharged into the second chlorinator from the first chlorinator is cut off. Thereafter, discharge pipe 24 in the bottom of chlorinator A is opened permitting the ferric chloride solution to drain therefrom by way of the discharge line 25.

Meanwhile, liquid chlorine feed line 26 of chlorinator B is opened to feed chlorine into its ferrous chloride solution therein whereby oxidation of the ferrous chloride solution takes place with an increase in temperature accompanied by an increase in pressure and an increase in the rate of chlorination. As with the first chlorinator, chlorination in the second chlorinator continues rapidly until a major portion of the ferrous chloride is oxidized to ferric chloride. Thereafter, the rate of chlorination slows down and, with valved pipe 30 closed and connecting pipe 33 open, the free chlorine generated in clorinator B escapes by way of the connecting pipe 33 into chlorinator C in which it is dissipated by oxidation of the ferrous chloride therein.

When it is apparent that chlorination is substantially complete in the scond chlorinator, the latter is cut out of the system by closing off the liquid chloride feed to the chlorinator and by closing off the connecting pipe 33 to the third chlorinator C. Liquid chlorine is then fed to the chlorinator C. In the meantime, the first chlorinator has been emptied of its ferric solution but before it can be filled with fresh ferrous chloride solution it must be depressurized, and to this end the valve in the pipe line 30 is opened thereby permitting any gaseous components in chlorinator A to escape by way of pipe 31 into the bell 32 immersed in the receiving vessel 20. Ferrous chloride solution is then fed into chlorinator A from the receiving vessel 20 until this chlorinator is again filled to capacity at which time, the valve 23 is closed, valved connecting pipe 33 opened and valved discharged pipe 30 closed and the liquid chlorine feed line opened to effect chlorination of the fresh supply of ferrous chloride in chlorinator A.

The same sequence of steps are followed for the other three chlorinators in a substantially continuous operation.

The ferric chloride solutions discharged, in sequence from the chlorinators A B C D, is fed by way of discharge pipe 25 to one or more evaporators basins 34. These may be similar in construction to the evaporators basins 17 and may be used to further concentrate the ferric chloride solution by solar evaporation. From the basins 34 the concentrated ferric chloride may be pumped by way of pipe 35 to a storage tank 36.

The following example will further illustrate the process of the instant invention:

Employing apparatus of the type illustrated in the drawing and a pickle liquor analyzing about 18% ferrous chloride, 1.5% hydrochloric acid and balance water, commercial production of ferric chloride was carried in substantially continuously at a chlorination rate of about 137 pounds per hour using a ferrous chloride concentrate of about 32 weight percent ferrous chloride. To this end, the pickle liquor, at temperature of about 130°F was fed continuously to the neutralizing basins and recycled in these basins until the concentration of free acid was below 0.1%, on a solution weight basis. From the neutralizing basins the neutralized solution was fed to the solar evaporators operating at ambient temperatures in which evaporators the neutralized solution was held until it analyzed from about 32 – 33% ferrous chloride. This conentrate was then fed to the receiving tank. At start up, the concentrate in the receiving tank was fed into each pressure vessel or chlorinator until it was substantially full. Thereafter, concentrate from the receiving tank was fed to the chlorinators in a predetermined sequence as described above.

After each chlorinator tank was full, liquid chlorine was fed into the first tank at pressures in the range of from 15 – 18 psi and at an average feed rate of about 112 pounds per hour for a period of 9 hours. At the end of two hours, the percent conversion of ferrous to ferric ions was about 21.6% and at the end of 9 hours the percent conversion was about 91.5%, during which period the temperature in the chlorinator rose from about 76° to 121°F. Chlorination was continued for 6 additional hours at the end of which time the percent conversion of the ferrous ions to ferric ions was about 99.9%. During the latter part of the chlorination period, free chlorine was detected escaping over into the second chlorinator with the conversion of some of the ferrous ions to ferric ions. When this occured, the feed rate of liquid chlorine to the first chlorinator was reduced until at the end of 15 hours it was about 53 pounds per hour. At this stage about 30% conversion of the ferrous ions had taken place in the second chlorinator and its temperature had risen from about 80°F to about 106°F. The first chlorinator was then isolated from the system in the manner described above and its ferric chloride solution discharged to the concentrator storage basins. Liquid chlorine was then fed into the second chlorinator. For the next 11 hours the average pressure in the second chlorinator was about 13.4 psi and the average chlorination feed rate was about 49 pounds per hour. The temperature in the second chlorinator rose to 117°F. At the end of this period the percent conversion of ferrous to ferric ions in the second chlorinator was about 79%. During this same period, free chlorine was detected passing over into the third chlorinator whereupon the chlorine feed rate to the second chlorinator was gradually reduced so that after this 11 hour period conversion of the ferrous ions to ferric ions in the third chlorinator was about 10.8%. The feeding of liquid chlorine to the second chlorinator was continued for another seven hours at a somewhat higher average feed rate, that is to say, about 85 pounds per hour, at the end of which time the second chlorinator was isolated from the system. The percent conversion of ferrous ions to ferric ions was about 99.9%. At the same time, the percent conversion of the ferrous ions in the third chlorinator had reached about 46.4% and the temperature in the third chlorinator had risen to about 104°F.

Following isolation of the second chlorinator liquid chlorine was then fed to the third chlorinator at an average pressure of about 20 psi and average feed rate of about 199 pounds per hour for about 8 hours. At the end of this time, substantially 99.9% of the ferrous ions in the third chlorinator were oxidized to ferric ions. The third chlorinator was then isolated from the system. During this time, free chlorine was passing over from the third chlorinator into the fourth chlorinator so that at the time the third chlorinator was isolated the percent conversion of ferrous ions to ferric ions in the fourth chlorinator had risen to about 47.4%. Liquid chlorine was then fed into the fourth chlorinator for about 6 hours at an average feed rate of about 179 pounds per hour, and average pressure of about 20 psi. The temperature in the fourth chlorinator was initially relatively high, i.e., 125°F but gradually droped as chlorination continued until at the end of 6 hours the temperature in the fourth chlorinator was about 109° F. Conversion of ferrous ions to ferric ions in the fourth chlorinator was about 99.9%.

During chlorination of the ferrous chloride solution in the second and third chlorinators the ferric chloride solution was discharged from the first chlorinator. The latter was then depressurized by opening its valved pipe line leading to the immersed bell in the receiving vessel, whereby any free chlorine in the first chlorinator was dissipated in the ferrous chloride solution in the receiving vessel. Thereafter, the first chlorinator was again filled with ferrous chloride solution and by the time the second chlorinator had been isolated from the system, liquid chlorine was being fed to the first chlorinator. Similarly, with respect to each succeeding chlorinator, the chlorination of the ferrous chloride concentrate was carried out continuously.

We claim:

1. Method for making a ferric chloride solution from a weakly acidic aqueous solution of ferrous chloride comprising the steps of:
   a. substantially continuously neutralizing in a plurality of neutralizing vessels the free acid in said aqueous solution of ferrous chloride by metallic iron to the point that the concentration of free acid is reduced therein below about 0.10%, on a solution weight basis;
   b. substantially continuously concentrating the neutralized aqueous solutions of ferrous chloride by solar evaporation at ambient temperatures in a plurality of evaporators to at least about 32–35% ferrous chloride concentration;
   c. substantially continuously feeding the concentrated ferrous chloride solutions to a receiving vessel and from thence to a battery of chlorinating vessels;
   d. substantially continuously contacting the aqueous solutions of ferrous chloride with liquid chlorine in a predetermined sequence in each of the chlorinating vessels at elevated temperatures and pressures to form aqueous solutions of ferric chloride, and wherein said liquid chlorine is introduced into each of the chlorinating vessels adjacent the bottom of the aqueous solutions of ferrous chloride therein;

e. substantially continuously discharging the said ferric chloride containing aqueous solutions from the said chlorinators and wherein any free chlorine remaining in the chlorinators, following the discharges of said ferric chloride containing aqueous solutions therefrom, is absorbed in the ferrous chloride solution in said receiving vessel.

* * * * *